US012657400B2

(12) United States Patent     (10) Patent No.:   US 12,657,400 B2

Dai et al.     (45) Date of Patent:    Jun. 16, 2026

(54) SYSTEMS AND METHODS FOR VISION-LANGUAGE MODEL INSTRUCTION TUNING

(71) Applicant: Salesforce, Inc., San Francisco, CA (US)

(72) Inventors: Wenliang Dai, Singapore (SG); Junnan Li, Singapore (SG); Chu Hong Hoi, Singapore (SG); Dongxu Li, Singapore (SG)

(73) Assignee: Salesforce, Inc., San Francisco, CA (US)

( * ) Notice: Subject to any disclaimer, the term of this patent is extended or adjusted under 35 U.S.C. 154(b) by 292 days.

(21) Appl. No.: 18/505,982

(22) Filed: Nov. 9, 2023

(65) Prior Publication Data

US 2024/0160858 A1     May 16, 2024

Related U.S. Application Data

(63) Continuation-in-part of application No. 18/160,664, filed on Jan. 27, 2023, now Pat. No. 12,462,592.

(60) Provisional application No. 63/500,551, filed on May 5, 2023, provisional application No. 63/424,413, filed on Nov. 10, 2022.

(51) Int. Cl.
    *G06F 40/40*       (2020.01)
    *G06V 10/774*     (2022.01)
    *G06V 10/82*      (2022.01)
    *G06V 20/70*      (2022.01)

(52) U.S. Cl.
    CPC ............ *G06F 40/40* (2020.01); *G06V 10/774* (2022.01); *G06V 10/82* (2022.01); *G06V 20/70* (2022.01)

(58) Field of Classification Search
    CPC ...... G06F 40/40; G06V 10/774; G06V 10/82; G06V 20/70
    USPC ......................................................... 382/156
    See application file for complete search history.

(56) References Cited

U.S. PATENT DOCUMENTS

| | | |
|---|---|---|
| 12,198,048 B2 | 1/2025 | Singh et al. |
| 2023/0281400 A1 | 9/2023 | Zirui |
| 2023/0368510 A1 | 11/2023 | Chen et al. |

(Continued)

OTHER PUBLICATIONS

Alayrac et al., "Flamingo: a Visual Language Model for Few-Shot Learning", DeepMind, Apr. 28, 2022., arXiv: 2204.14198v1, pp. 1-66.

(Continued)

*Primary Examiner* — Charlotte M Baker

(74) *Attorney, Agent, or Firm* — Haynes and Boone, LLP

(57) ABSTRACT

Embodiments described herein provide a method of generating a vision-language task output to a text instruction relating to an input image, the method comprising receiving, via a data interface, the input image and the text instruction comprising an instruction relating to the image. The method further includes encoding, via an image encoder, the image into a first image representation. The method further includes generating, by a multimodal encoder, a second image representation based on cross-attending the first image representation to the text instruction. The method further includes generating, by a neural network based language model, a vision-language task output in response to the text instruction based on an input combining the second image representation and the text instruction.

20 Claims, 12 Drawing Sheets

(56) References Cited

U.S. PATENT DOCUMENTS

2024/0087265 A1    3/2024  Park et al.
2024/0282094 A1*   8/2024  Tsimpoukelli ......... G06V 10/80

OTHER PUBLICATIONS

Deyao Zhu et al: "MiniGPT-4: Enhancing Vision-Language Understanding with Advanced Large Language Models", arxiv.org, Cornell University Library, 201 Olin Library Cornell University Ithaca, NY 14853, Apr. 20, 2023 (Apr. 20, 2023), XP091490134.
Jean-Baptiste Alayrac et al: "Flamingo: a Visual Language Model for Few-Shot Learning", A arxiv.org, Cornell University Library, 201 Olin Library Cornell University Ithaca, NY 14853, Apr. 29, 2022 (Apr. 29, 2022), XP091210828.
Junnan Li et al: "BLIP-2: Bootstrapping Language-Image Pre-training with Frozen Image Encoders and Large Language Models", arxiv.org, Cornell University Library, 201 Olin Library Cornell University Ithaca, NY 14853, May 1, 2023, XP091498386.
International Search Report and Written Opinion mailed Jul. 19, 2024, International Patent Application No. PCT/US2024/027695, 110 pages.
Wenliang Dai, Junnan Li, Dongxu Li, Anthony Meng Huat Tiong, Jungi Zhao, Weisheng Wang, Boyang Li, Pascale Fung, and Steven Hoi. "Instructblip: Towards general-purpose vision-language models with instruction tuning," 2023.
Chen et al,"Subject-driven Text-to-Image Generation via Apprenticeship Learning", arxiv (Cornell University), Apr. 14, 2023, pp. 1-18, XP093186354, DOI: 10.48550/arxiv.2304.00186 Retrieved from the Internet: URL:https://arxiv.org/pdf/2304.00186v2 [retrieved on Jul. 16, 2024].
Jia et al., "Taming Encoder for Zero Fine-tuning Image Customization with Text-to-Image Diffusion Models", arxiv.org, Cornell University Library, 201 Olin Library Cornell University Ithaca, NY 14853, Apr. 5, 2023, XP091477959, 10 pages.
Li et al.,"BLIP-Diffusion: Pre-trained Subject Representation for Controllable Text-to-Image Generation and Editing", arxiv.org, May 24, 2023, XP093180794, DOI: 10.48550/arxiv.2305.14720 Retrieved from the Internet: URL: https://arxiv.org/pdf/2305.14720v1 [retrieved on Jul. 16, 2024],22 pages.
Ruiz et al.,"DreamBooth: Fine Tuning Text-to-Image Diffusion Models for Subject-Driven Generation", arxiv (Cornell University), Mar. 15, 2023, XP093179964, DOI: 10.48550/arxiv.2208.12242 Retrieved from the Internet: URL:https://arxiv.org/pdf/2208.12242v2 [retrieved on Jul. 16, 2024], 25 pages.
International Search Report and Written Opinion for PCT/US2024/027830, dated Jul. 17, 2024, 14 pages.

\* cited by examiner

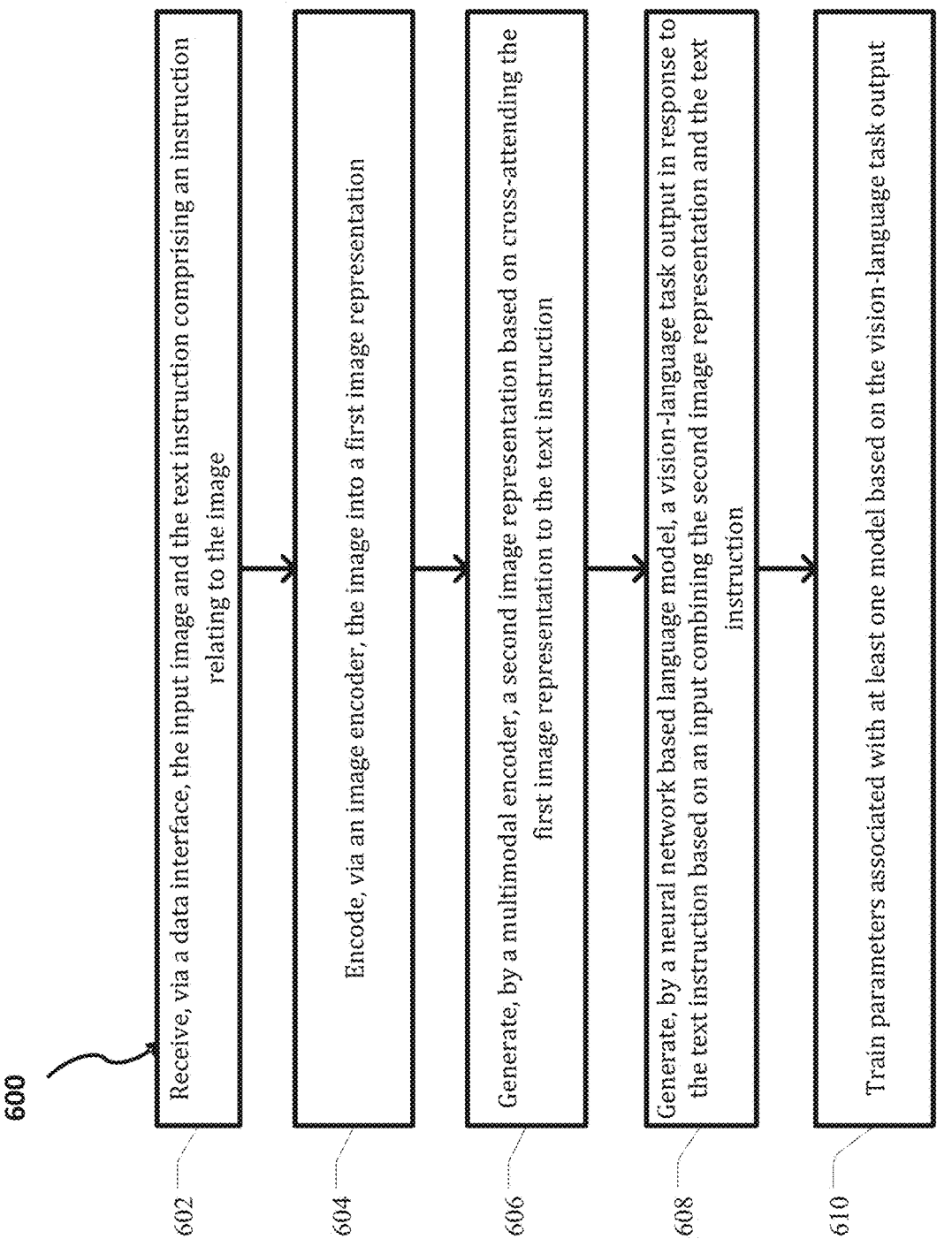

600

602 Receive, via a data interface, the input image and the text instruction comprising an instruction relating to the image 604 Encode, via an image encoder, the image into a first image representation 606 Generate, by a multimodal encoder, a second image representation based on cross-attending the first image representation to the text instruction 608 Generate, by a neural network based language model, a vision-language task output in response to the text instruction based on an input combining the second image representation and the text instruction 610 Train parameters associated with at least one model based on the vision-language task output

Input Image 102b

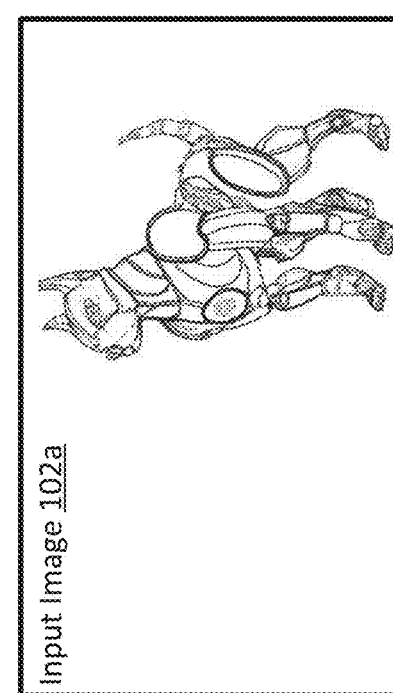

Instruction 112b:

What could have happened based on the current scene?

Output Text 124b:

Based on the current scene in the image, it is possible that a hurricane or severe weather event caused significant damage to the buildings and infrastructure in the area. The person walking through the debris-covered area suggests that they are inspecting the damage caused by the disaster. The presence of palm trees indicates that the location may be in a tropical or sub-tropical region.

FIG. 7A

Input Image 102a

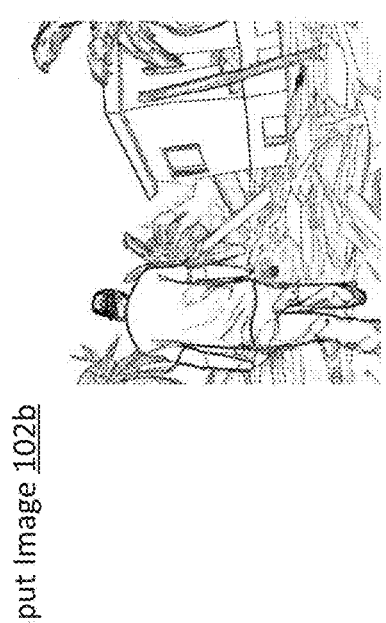

Instruction 112a:

What makes this dog special?

Output Text 124a:

The dog in the image is wearing futuristic armor, giving it a unique and futuristic appearance. This combination of elements makes the dog stand out from other dogs and adds an element of fantasy or sci-fi to the image. Additionally, the dog's posture and facial expression convey a sense of confidence and determination, further emphasizing its unique features.

| | NoCaps | Flickr 30K | GQA | VSR | IconQA | TextVQA | Visdial | HM | VizWiz | SciQA image | MSVD QA | MSRVTT QA | iVQA |
|---|---|---|---|---|---|---|---|---|---|---|---|---|---|
| Flamingo-3B | - | 60.6 | - | - | - | 30.1 | - | 53.7 | 28.9 | - | 27.5 | 11.0 | 32.7 |
| Flamingo-9B | - | 61.5 | - | - | - | 31.8 | - | 57.0 | 28.8 | - | 30.2 | 13.7 | 35.2 |
| Flamingo-80B | - | 67.2 | - | - | - | 35.0 | - | 46.4 | 31.6 | - | 35.6 | 17.4 | 40.7 |
| BLIP-2 (FlanT5XL) | 104.5 | 76.1 | 44.0 | 60.5 | 45.5 | 43.1 | 45.7 | 53.0 | 29.8 | 54.9 | 33.7 | 16.2 | 40.4 |
| BLIP-2 (FlanT5XXL) | 98.4 | 73.7 | 44.6 | 68.2 | 45.4 | 44.1 | 46.9 | 52.0 | 29.4 | 64.5 | 34.4 | 17.4 | 45.8 |
| BLIP-2 (Vicuna-7B) | 107.5 | 74.9 | 38.6 | 50.0 | 39.7 | 40.1 | 44.9 | 50.6 | 25.3 | 53.8 | 18.3 | 9.2 | 27.5 |
| BLIP-2 (Vicuna-13B) | 103.9 | 71.6 | 41.0 | 50.9 | 40.6 | 42.5 | 45.1 | 53.7 | 19.6 | 61.0 | 20.3 | 10.3 | 23.5 |
| InstructBLIP (FlanT5XL) | 119.9 | 84.5 | 48.4 | 64.8 | 50.0 | 46.6 | 46.6 | 56.6 | 32.7 | 70.4 | 43.4 | 25.0 | 53.1 |
| InstructBLIP (FlanT5XXL) | 120.0 | 83.5 | 47.9 | 65.6 | 51.2 | 46.6 | 48.5 | 54.1 | 30.9 | 70.6 | 44.3 | 25.6 | 53.8 |
| InstructBLIP (Vicuna-7B) | 123.1 | 82.4 | 49.2 | 54.3 | 43.1 | 50.1 | 45.2 | 59.6 | 34.5 | 60.5 | 41.8 | 22.1 | 52.2 |
| InstructBLIP (Vicuna-13B) | 121.9 | 82.8 | 49.5 | 52.1 | 44.8 | 50.7 | 45.4 | 57.5 | 33.4 | 63.1 | 41.2 | 24.8 | 51.0 |

FIG. 8

| Model | Held-in Avg. | GQA | ScienceQA (image-context) | IconQA | VizWiz | iVQA |
|---|---|---|---|---|---|---|
| InstructBLIP (FlanT5$_{XL}$) | 94.1 | 48.4 | 70.4 | 50.0 | 32.7 | 53.1 |
| w/o Instruction-aware Visual Features | 89.8 | 45.9 (↓2.5) | 63.4 (↓7.0) | 45.8 (↓4.2) | 25.1 (↓7.6) | 47.5 (↓5.6) |
| w/o Data Balancing | 92.6 | 46.8 (↓1.6) | 66.0 (↓4.4) | 49.9 (↓0.1) | 31.8 (↓0.9) | 51.1 (↓2.0) |
| InstructBLIP (Vicuna-7B) | 100.8 | 49.2 | 60.5 | 43.1 | 34.5 | 52.2 |
| w/o Instruction-aware Visual Features | 98.9 | 48.2 (↓1.0) | 55.2 (↓5.3) | 41.2 (↓1.9) | 32.4 (↓2.1) | 36.8 (↓15.4) |
| w/o Data Balancing | 98.8 | 47.8 (↓1.4) | 59.4 (↓1.1) | 43.5 (↑0.4) | 32.3 (↓2.2) | 50.3 (↓1.9) |

FIG. 9

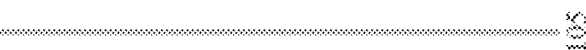
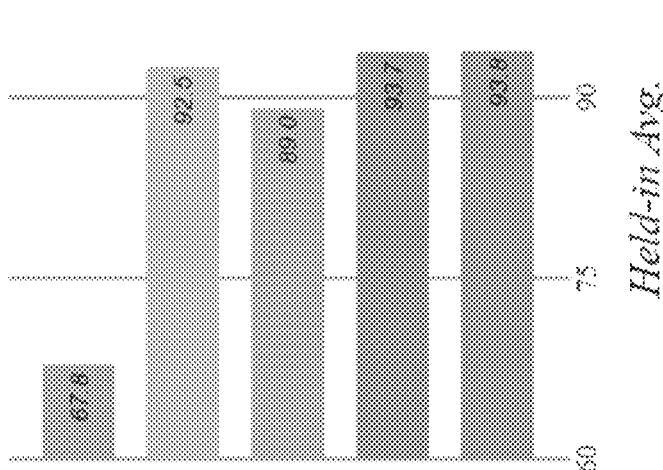
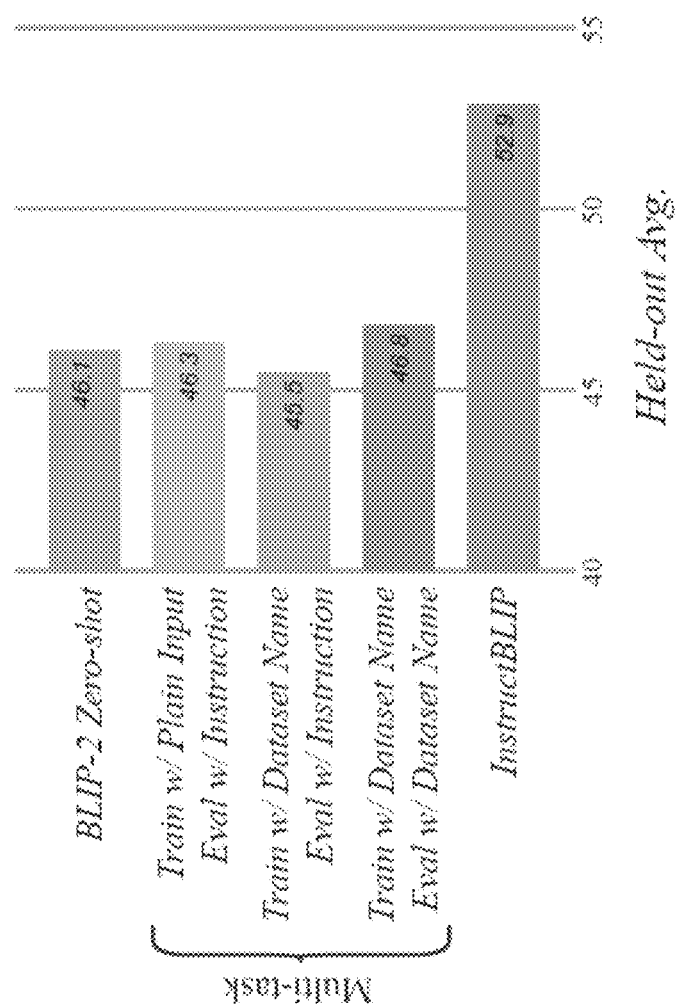
FIG. 10

| | ScienceQA IMG | OCR-VQA | OKVQA | A-OKVQA | | | |
| | | | | Direct Answer | | Multi-choice | |
| | | | | Val | Test | Val | Test |
|---|---|---|---|---|---|---|---|
| Previous SOTA | LLaVA 89.0 | GIT 70.3 | PaLM-E(562B) 66.1 | 56.3 | 61.6 | 73.2 | 73.6 |
| BLIP-2 (FlanT5_XXL) | 89.5 | 72.7 | 54.7 | 57.6 | 53.7 | 80.2 | 76.2 |
| InstructBLIP (FlanT5_XXL) | 90.7 | 73.3 | 55.5 | 57.1 | 54.8 | 81.0 | 76.7 |
| BLIP-2 (Vicuna-7B) | 77.3 | 69.1 | 59.3 | 60.0 | 58.7 | 72.1 | 69.0 |
| InstructBLIP (Vicuna-7B) | 79.5 | 72.8 | 62.1 | 64.0 | 62.1 | 75.7 | 73.4 |

FIG. 11

SYSTEMS AND METHODS FOR VISION-LANGUAGE MODEL INSTRUCTION TUNING

CROSS REFERENCE(S)

The instant application is a nonprovisional of and claim priority under 35 U.S.C. 119 to U.S. provisional application No. 63/500,551, filed May 5, 2023, which is hereby expressly incorporated by reference herein in its entirety.

The instant application is a continuation-in-part of and claims priority under 35 U.S.C. 120 to co-pending and commonly-owned U.S. nonprovisional application Ser. No. 18/160,664, filed Jan. 27, 2023. which in turn claims priority to U.S. provisional application No. 63/424,413, filed Nov. 10, 2022, both of which are hereby expressly incorporated by reference herein in its entirety.

TECHNICAL FIELD

The embodiments relate generally to machine learning systems for vision-language models, and more specifically to systems and methods for vision-language model instruction tuning.

BACKGROUND

Machine learning systems have been widely used in vision-language tasks. Vision-Language models are trained to take both images and text inputs and output text. For example, the text input may include a user question about the image input, e.g., "what is the red dot next to the head of the dog," and the output text would be a response to the question based on the image. Building general-purpose vision-language model is challenging due to the rich input distributions and task diversity resulting from the additional visual input.

BRIEF DESCRIPTION OF THE DRAWINGS

FIG. 6 is an example logic flow diagram illustrating a method of vision-language instruction responding based on the framework shown in FIGS. 1-3, according to some embodiments.

FIGS. 7A-7B illustrate exemplary vision-language instruction responses, according to some embodiments.

FIGS. 8-11 provide charts illustrating exemplary performance of different embodiments described herein.

Figure 1:
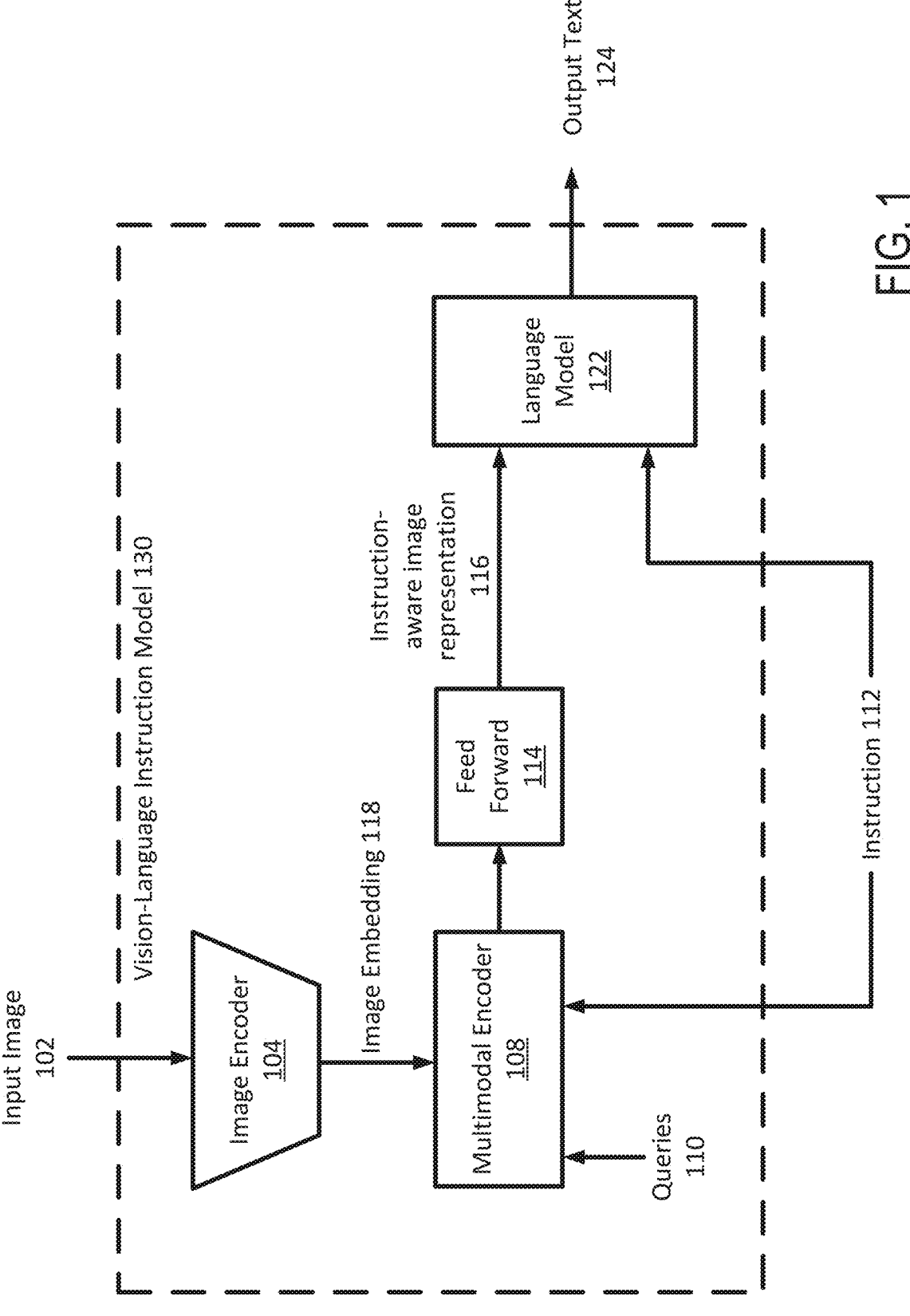
FIG. 1 is a simplified diagram illustrating a vision-language instruction model framework according to some embodiments.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

As used herein, the term "Large Language Model" (LLM) may refer to a neural network based deep learning system designed to understand and generate human languages. An LLM may adopt a Transformer architecture that often entails a significant amount of parameters (neural network weights) and computational complexity. For example, LLM such as Generative Pre-trained Transformer (GPT) 3 has 175 billion parameters, Text-to-Text Transfer Transformers (T5) has around 11 billion parameters.

Overview

Vision-Language models are trained to take both images and text inputs and output text. For example, the text input may include a user question about the image input, e.g., "what is the red dot next to the head of the dog," and the output text would be a response to the question based on the image. Building general-purpose vision-language model is challenging due to the rich input distributions and task diversity resulting from the additional visual input.

In view of the need for improved systems and methods for vision-language models, embodiments described herein describe vision-language models that employ multi-modal encoding to encode an image input together with textual information from a text instruction (prompt). A vision-language model may include an image encoder, a text encoder, and a large language model (LLM). An encoded image and an encoded text may be input to the LLM in order to generate a response output based on the text and image. In place of (or in addition to) a generic image encoder, a multi-modal encoder may be used which encodes the image with cross-attention to the text instruction. In some embodiments, the multi-model encoder is as described in application Ser. No. 18/160,664, incorporated herein by reference (i.e., the "Q-Former"). The resulting encoded representation of the image is generated in a way that is aware of the text instruction. For example, if the text instruction is "which pizza has more toppings?" and the image included a table full of various food items including two pizzas, the instruction-aware encoding of the image may more fully and specifically encode information about the pizzas and less information of the rest of the image. This more efficient/focused image representation is used as an input together with the instruction to an LLM which generates a response output to the instruction based on the image.

Training of the subject-driven image generation model may be performed in multiple stages. In a first pre-training stage, a multimodal encoder may be trained to generate a latent representation of an input image and associated text input. Specifically, this may be done as the vision-language (multimodal) representation learning of the multimodal encoder (i.e., Q-Former) described in U.S. patent application Ser. No. 18/160,664, incorporated herein by reference. In this pre-training stage, vision-language representation learning enforces the multimodal encoder to learn visual representation that is most relevant to the input text.

In a second pre-training stage, vision-to-language generative learning may be performed by connecting the output of the updated multimodal encoder to an LLM that generates an output text. The multimodal encoder is again trained such that its output visual representation can be interpreted by the LLM. In some embodiments, during the second stage, only the multimodal encoder and the queries are updated while the image encoder and the language model are frozen. Additional details of vision-language generative learning is described in U.S. patent application Ser. No. 18/160,664, incorporated herein by reference.

At inference, given an input image and a text instruction, the multimodal encoder generates an instruction-aware image representation. The image representation is combined with the instruction and provided to a generic LLM which generates an output text in response to the instruction. Further fine-tuning may be performed for downstream tasks such as multiple-choice answering.

Embodiments described herein provide a number of benefits. For example, a variety of available LLMs such as GPT-3.5, GPT-4.0, etc., may be used with the methods described herein, as the input prompt for the various LLMs may easily be replaced with a prompt that includes the instruction-aware image representation without modifying parameters of the base LLM itself. This may reduce the amount of training/fine-tuning required to create a final vision-language instruction model. Improved accuracy of the output text can be achieved for various different vision-language tasks as shown in FIGS. 8-11, at least due to improved latent representations of input images. The latent image representations, since they are instruction-aware, are able to contain more relevant information using less memory. Therefore, neural network technology in performing vision-language tasks is improved.

FIG. 1 is a simplified diagram illustrating a vision-language instruction model framework according to some embodiments. Vision-language instruction model 130 comprises a language mode 122 and a multimodal encoder 108 which aids in the generation of an instruction-aware image representation 116 for language model 122. Language model 122 may be a large language model (LLM). For example, language model 122 may be a FlanT5 model as described in Chung et al., Scaling instruction-finetuned language models, arXiv:2210.11416, 2022. Vision-language instruction model 130 takes an input image 102, and an instruction 112, and based on those inputs generates an output text 124. For example, an input image 102 may be an image of various vegetables and other ingredients on a table. The instruction 112 may be "Can you tell me about this image in detail?". With these exemplary inputs, vision-language instruction model 130 would generate an output text such as: "The image depicts a collection of various vegetables including carrots, cucumbers, tomatoes, and nuts arranged on a table. There are several jars filled with different types of ingredients, such as peanuts, cashews, and pumpkin seeds. These ingredients are likely to be part of a healthy meal or snack".

The multimodal encoder 108 is a lightweight transformer which employs a set of learnable queries 110 to extract visual features from the frozen image encoder 104. In other words, the multimodal encoder 108 acts as an information bottleneck between the frozen image encoder 104 and the frozen language model 122, where it feeds the most useful visual features from input image 102 for the language model 122 to output the desired text. For example, the multimodal encoder 108 may contain 188 M parameters, which is relatively much fewer parameters to update compared to an LLM or image encoder.

Input image 102 may be encoded by an image encoder 104 into an image embedding 119, which may be a vector representation of the input image 102. Image encoder 104 may be a pretrained image encoder which extracts generic image features. Instruction 112 may be encoded by a text encoder into a text feature vector. The image feature vector and text feature vector may be input to multimodal encoder 108. Multimodal encoder 108 may be a query transformer ("Q-Former") as described in U.S. patent application Ser. No. 18/160,664, incorporated herein by reference. Multimodal encoder 108 may also take queries 110 as an input. Queries 110 may be randomly initialized vectors which may be tuned as part of the training process. Multimodal encoder 108 generates a vector representation of the input image (e.g., instruction-aware image representation) by using the instruction 112 to attend to the portions of input image 102 most relevant to the instruction 112. In some embodiments, a feed forward neural network further updates the vector representation of the subject, providing instruction-aware image representation 116.

Instruction-aware image representation 116 and instruction 112 may be combined to generate the prompt for language model 122. Language model 122 may then generate an output text 124, a vision-language task output, based on the prompt.

Training of the vision-language instruction model 130 may be performed in multiple stages. In a first pre-training stage, multimodal encoder 108 may be trained to generate a latent representation of an input image and associated instruction 112. Specifically, this may be done as the vision-language (multimodal) representation learning of the multimodal encoder (i.e., Q-Former) described in U.S. patent application Ser. No. 18/160,664, incorporated herein by reference. In this pre-training stage, vision-language representation learning enforces the multimodal encoder to learn to generate a visual representation that is most relevant to the instruction 112.

In a second pre-training stage, vision-to-language generative learning is performed by connecting the output of the updated multimodal encoder 108 to an LLM (e.g., language model 122) that generates an output text 124. The multimodal encoder 108 is again trained such that its output visual representation can be interpreted by the LLM. In some embodiments, during the second stage, only the multimodal encoder 108 and the queries 110 are updated while the image encoder 104 and the language model 122 are frozen. Additional details of vision-language generative learning at stage 102 is described in U.S. patent application Ser. No. 18/160, 664, incorporated herein by reference. A third pre-training stage (instruction tuning) is described with respect to FIG. 3.

Figure 2:
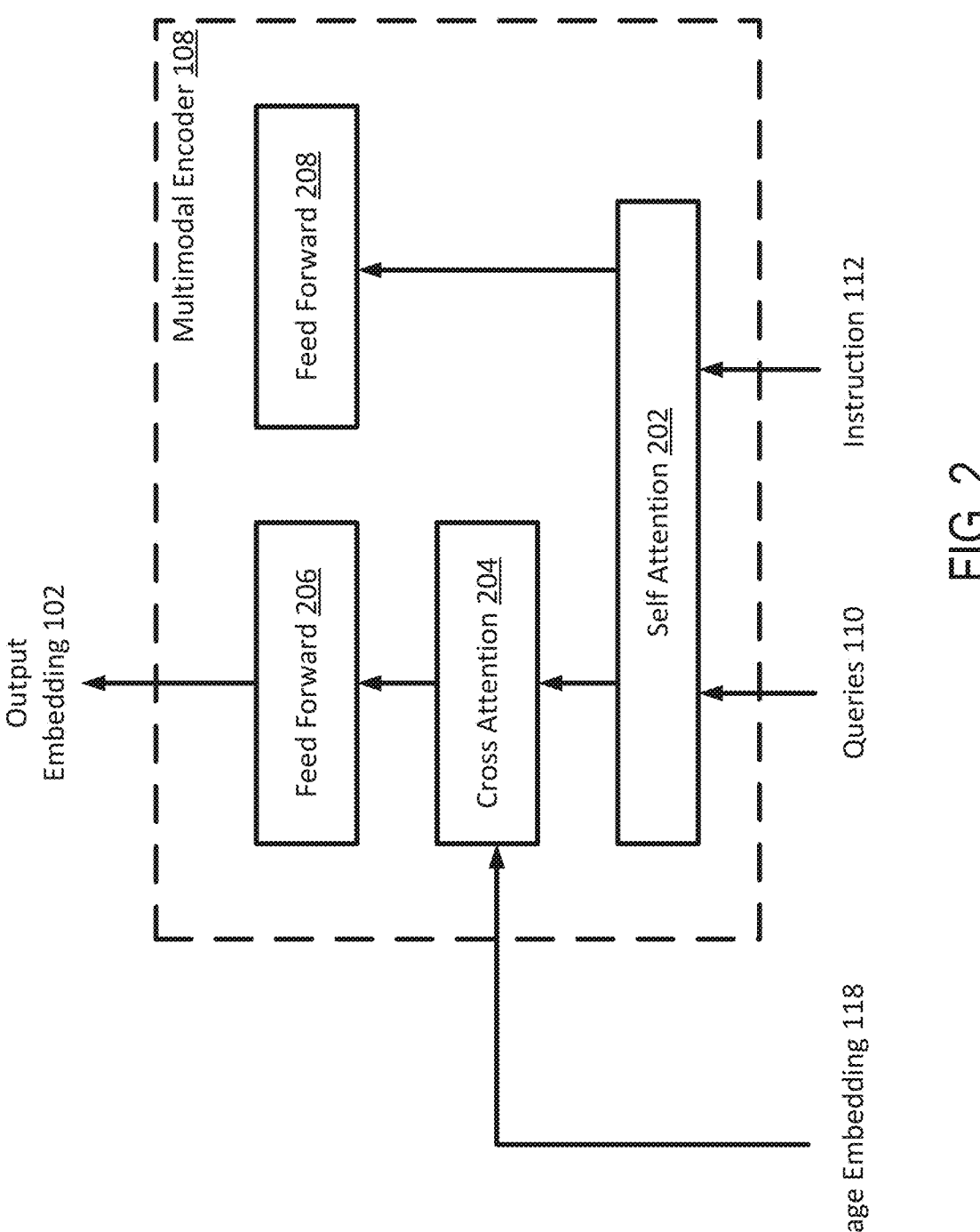
FIG. 2 is a simplified diagram illustrating an exemplary multimodal encoder, according to some embodiments.

FIG. 2 is a simplified diagram illustrating an exemplary multimodal encoder 108, according to some embodiments. Multimodal encoder 108 may be a "query transformer" as described in U.S. patent application Ser. No. 18/160,664, incorporated herein by reference. The multimodal encoder 108 consists of two transformer submodules that share the same self-attention layer 202. An image transformer with cross attention 204 and feed forward 206 interacts with the frozen image encoder 104 by cross-attending image embedding 118 for visual feature extraction. A text transformer including feed forward 208 can function as both a text encoder and a text decoder.

In one embodiment, the image embedding 118 from the image encoder 104 is passed to cross attention 204 comprising a stack of transfer blocks. A fixed number of learnable query embeddings ("queries") 110 are input to self attention 202. The queries 110 are also tunable, which may be deemed as parameters of the multimodal encoder 108 and updated with the multimodal encoder 108 during training.

The queries 110 interact with each other through self-attention layer 202 to produce self-attention outputs. In one implementation, the queries 110 may additionally interact with the instruction 112 through the same self-attention layer 202, e.g., via attention masking.

The self-attention outputs then interact with frozen image features, e.g., the image representation from the frozen image encoder 104, through cross-attention layers 204 to produce cross-attention outputs. In one implementation, the cross-attention layers 204 may be inserted every other transformer block.

The cross-attention outputs may be passed through a feed forward layer 206 that generates the output embedding 102 as a transformed image representation for the input image 102. For example, 32 queries may be employed, where each query has a dimension of 768 (same as the hidden dimension of the multimodal encoder 108). The size of output embedding 102 (32×768) is much smaller than the size of frozen image features (e.g. 257×1024 in some embodiments).

On the other hand, the text transformer receives and encodes the input instruction 112. Specifically, text tokens in the instruction 112 interact with each other through self-attention layers 202 to produce self-attention outputs.

Different vision-language objectives are then adopted into forcing the queries 110 to extract visual information from the image representation that is most relevant to the text instruction 112. A feed forward layer 208 may then generate a text representation from the self-attention outputs. Depending on the training stage, instruction 112 may be another text input such as an image caption associated with input image 102.

In one embodiment, the query representation (output embedding 102) and the text representation may further be used to compute different pre-training objectives that share the same input format and model parameters. Each objective employs a different attention masking strategy between queries and text to control their interaction. One set of objectives may be jointly used to update parameters of multimodal encoder 108, as described in U.S. patent application Ser. No. 18/160,664, incorporated herein by reference.

Figure 3:
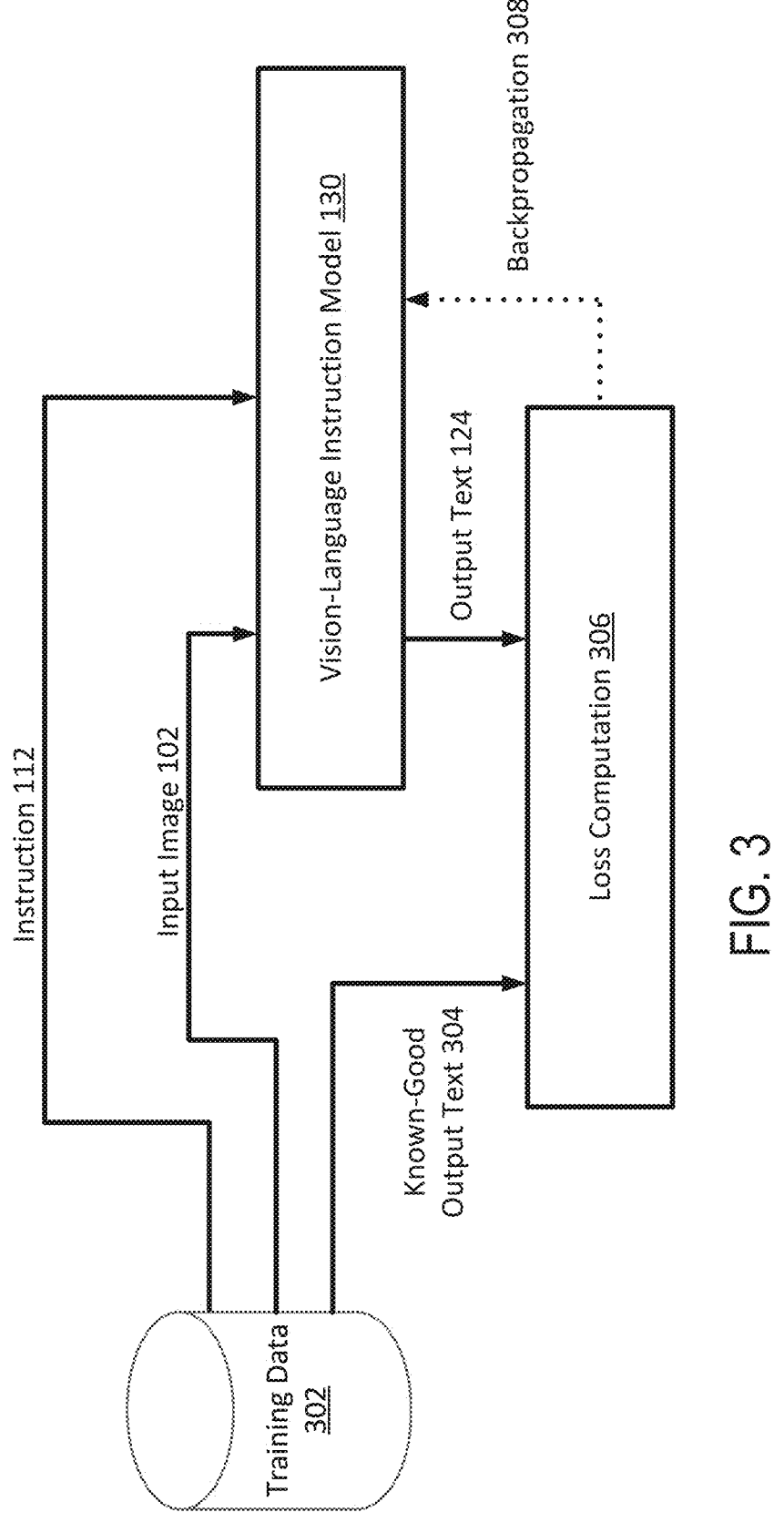
FIG. 3 is a simplified diagram illustrating a training framework for a vision-language instruction model according to some embodiments.

FIG. 3 is a simplified diagram illustrating a training framework for a vision-language instruction model 130 according to some embodiments. Specifically, FIG. 3 illustrates a pre-training stage of instruction tuning which may occur after the first pre-training stages described in FIG. 1. In the instruction-tuning stage multimodal encoder 108 is trained to generate instruction-aware image representations. Feed forward 114, queries 110, and/or language model 122 may be jointly trained with multimodal encoder 108. The aim of this stage is for the model to learn to represent an image in a way that efficiently represents the aspects of the image most relevant to an instruction 112. To accomplish this, training ground-truth input/output pairs of images may be used which include an input image 102, an instruction 112, and a known-good output text 304.

In some embodiments, instruction-aware image representation 116 and instruction 112 may be combined by the use of a prompt template. The prompt template may be, for example, "<image> Based on the image, answer the following question with a short answer: [Question]" where <image> is the instruction-aware image representation 116 and [question] is a question associated with the image in a training dataset. In some embodiments, prompt templates are used to convert a dataset into an instruction dataset. For example, one dataset may have a set of images and related captions, and the template may be "<image> Write a short description for the image." In this case, the caption is not used as the instruction, but rather only as the known-good output text 304 against which the generated output text 124 is compared.

The vision-language instruction model 130 may be provided an input image 102 including a subject, and an instruction 112 to generate an output text 124. The output text 124 may be compared to the known-good output text by loss computation 306. The loss computed by loss computation 306 may be used to update parameters of vision-language instruction model 130 via backpropagation 308. In some embodiments, backpropagation 308 may update parameters of multimodal encoder 108, queries 110, and/or language model 122. Loss computation 306 may include, for example, a cross entropy loss function. The instruction tuning learning stage is not specific to a certain type of instruction, and is performed using a variety of images with a variety of instructions. For training datasets with relatively uniform types of text (e.g., captions), variety may be injected to the training dataset by the use of randomly selected prompt templates which modify the prompt while maintaining the same semantics which would generate the expected output (e.g., caption).

When multiple training datasets are used where there are significant differences in the size of each dataset, mixing them uniformly could cause the vision-language instruction model 130 to overfit smaller datasets and underfit larger datasets. To mitigate the problem, datasets may be sampled with probabilities proportional to the square root of their sizes (i.e., the number of samples). For example, given D datasets with sizes $\{S_1, S_2, \ldots, S_D\}$, the probability of a data sample being selected from a dataset d during training may be $$p_d = \frac{\sqrt{S_d}}{\sum_{i=1}^{D} \sqrt{S_i}}$$

After the instruction tuning training stage, zero-shot inference may be performed using a pair of an input image 102 and instruction 112. However, better performance may be achieved in some circumstances with an additional domain-specific fine-tuning stage. The fine-tuning stage may be performed similar to the instruction tuning learning stages, but using a dataset of a specific domain.

In some embodiments, the vocabulary of language model 122 may be restricted in certain situations. For example, when performing instruction tuning using a training sample from a dataset where the known-good output text is always "true" or "false", it may be advantageous to limit the vocabulary of language model 122 to only those two words. In some embodiments, language model 122 is still prompted to generate an output text 124, then the log-likelihood for each word in the vocabulary is calculated, and the one with the highest value is used as the final prediction.

In some embodiments, multiple images may be input to multimodal encoder 108 for a single instruction, and the resulting instruction-aware image representations 116 may be concatenated together, averaged, or otherwise combined. For example, when a video is desired to be used as input, a number of successive frames from the video may be input as images to image encoder 104 and subsequently multimodal encoder 108, and the resulting instruction-aware image representations 116 may be concatenated. This preserves the changes in the images over the different frames of the video.

Computer and Network Environment

Figure 4A:
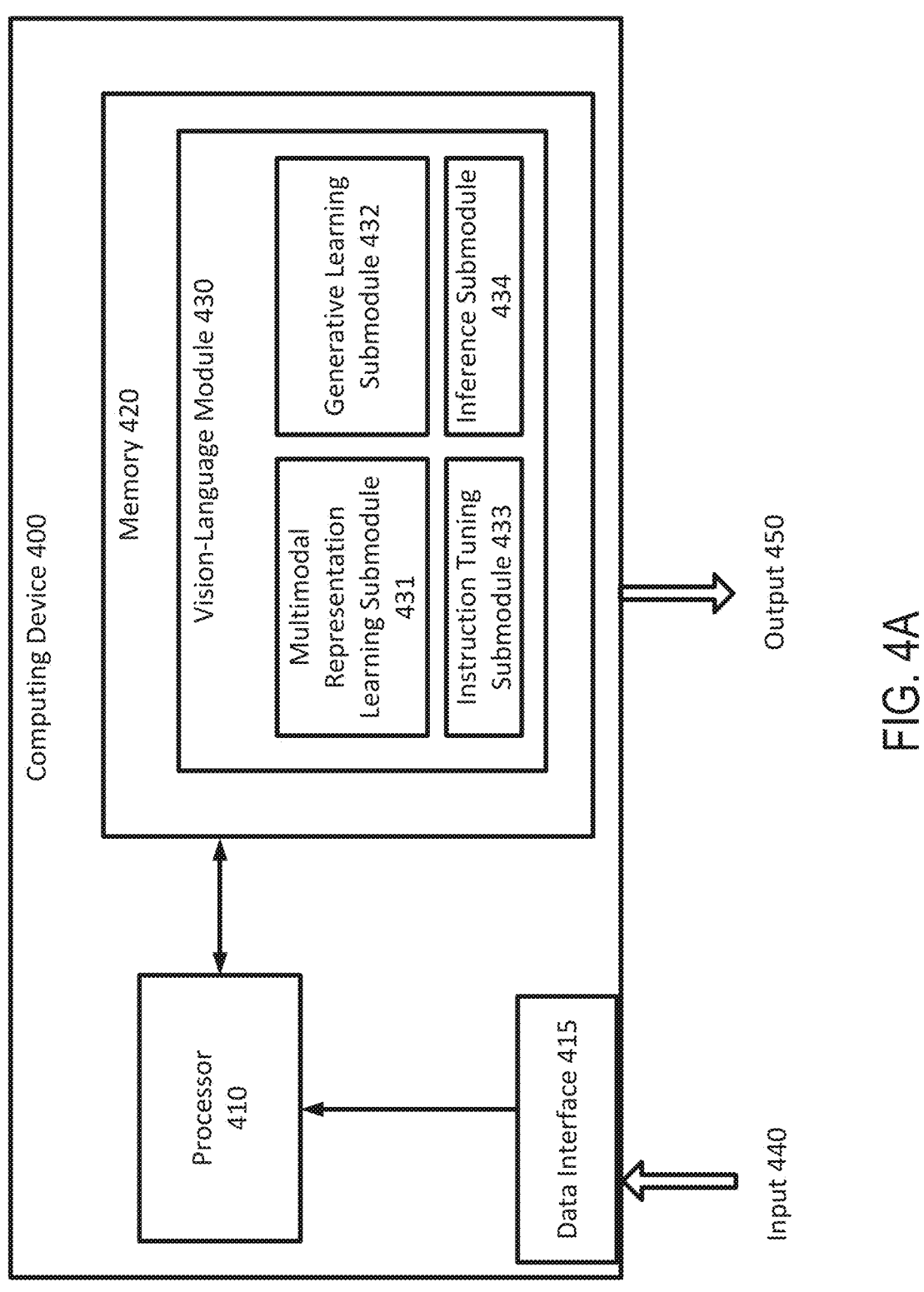
FIG. 4A is a simplified diagram illustrating a computing device implementing the vision-language instruction model framework described in FIGS. 1-3, according to some embodiments.

FIG. 4A is a simplified diagram illustrating a computing device 400 implementing the vision-language instruction model framework described in FIGS. 1-3, according to some embodiments. As shown in FIG. 4A, computing device 400 includes a processor 410 coupled to memory 420. Operation of computing device 400 is controlled by processor 410. And although computing device 400 is shown with only one processor 410, it is understood that processor 410 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 400. Computing device 400 may be implemented as a stand-alone subsystem, as a board added to a computing device, and/or as a virtual machine.

Memory 420 may be used to store software executed by computing device 400 and/or one or more data structures used during operation of computing device 400. Memory 420 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 410 and/or memory 420 may be arranged in any suitable physical arrangement. In some embodiments, processor 410 and/or memory 420 may be implemented on a same board, in a same package (e.g., system-in-package), on a same chip (e.g., system-on-chip), and/or the like. In some embodiments, processor 410 and/or memory 420 may include distributed, virtualized, and/or containerized computing resources. Consistent with such embodiments, processor 410 and/or memory 420 may be located in one or more data centers and/or cloud computing facilities.

In some examples, memory 420 may include non-transitory, tangible, machine readable media that includes executable code that when run by one or more processors (e.g., processor 410) may cause the one or more processors to perform the methods described in further detail herein. For example, as shown, memory 420 includes instructions for vision-language module 430 that may be used to implement and/or emulate the systems and models, and/or to implement any of the methods described further herein. vision-language module 430 may receive input 440 such as an input training data (e.g., input images, instructions, and known-good responses) via the data interface 415 and generate an output 450 which may be a text response.

The data interface 415 may comprise a communication interface, a user interface (such as a voice input interface, a graphical user interface, and/or the like). For example, the computing device 400 may receive the input 440 (such as a training dataset) from a networked database via a communication interface. Or the computing device 400 may receive the input 440, such as an image and/or instruction, from a user via the user interface.

In some embodiments, the vision-language module 430 is configured to generate an output text based on an input image and an instruction associated with the input image. The vision-language module 430 may further include multimodal representation learning submodule 431. Multimodal representation learning submodule 431 may be configured to train a multimodal encoder (e.g., multimodal encoder 108) to generate a vector representation of an input image based on an associated text as described in FIG. 1. The vision-language module 430 may further include generative learning submodule 432. Generative learning submodule 432 may be configured to further train the multimodal encoder (e.g., multimodal encoder 108) with a frozen language model to generate output text based on an input image (e.g., input image 102) and input text as described in FIG. 1. The vision-language module 430 may further include instruction-tuning submodule 433. Instruction-tuning submodule 433 may be configured to train parameters of the vision-language instruction model using training data of input images, instructions, and known-good text outputs as described in FIG. 1. The vision-language module 430 may further include inference submodule 434. Inference submodule 434 may be configured to generate an output text based on an input image and instruction as described in FIG. 1.

Some examples of computing devices, such as computing device 400 may include non-transitory, tangible, machine readable media that include executable code that when run by one or more processors (e.g., processor 410) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 4B:
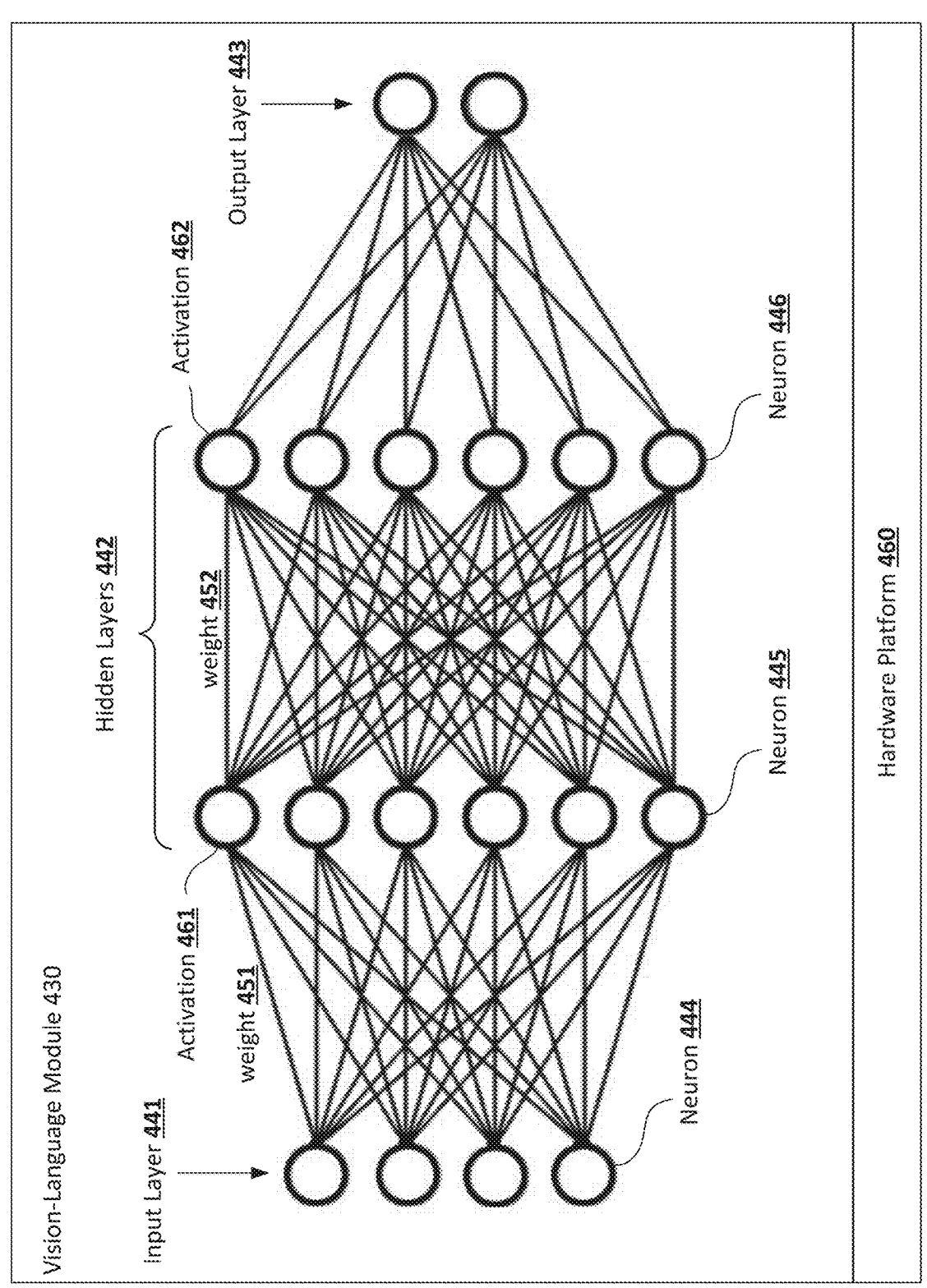
FIG. 4B is a simplified diagram illustrating a neural network structure, according to some embodiments.

FIG. 4B is a simplified diagram illustrating the neural network structure implementing the vision-language module 430 described in FIG. 4A, according to some embodiments. In some embodiments, the vision-language module 430 and/or one or more of its submodules 431-434 may be implemented at least partially via an artificial neural network structure shown in FIG. 4B. The neural network comprises a computing system that is built on a collection of connected units or nodes, referred to as neurons (e.g., 444, 445, 446). Neurons are often connected by edges, and an adjustable weight (e.g., 451, 452) is often associated with the edge. The neurons are often aggregated into layers such that different layers may perform different transformations on the respective input and output transformed input data onto the next layer.

For example, the neural network architecture may comprise an input layer 441, one or more hidden layers 442 and an output layer 443. Each layer may comprise a plurality of neurons, and neurons between layers are interconnected according to a specific topology of the neural network topology. The input layer 441 receives the input data (e.g., 440 in FIG. 4A), such as encoded instructions. The number of nodes (neurons) in the input layer 441 may be determined by the dimensionality of the input data (e.g., the length of a vector representation of an instruction). Each node in the input layer represents a feature or attribute of the input.

The hidden layers 442 are intermediate layers between the input and output layers of a neural network. It is noted that two hidden layers 442 are shown in FIG. 4B for illustrative purpose only, and any number of hidden layers may be utilized in a neural network structure. Hidden layers 442 may extract and transform the input data through a series of weighted computations and activation functions.

For example, as discussed in FIG. 4A, the vision-language module 430 receives an input 440 of an image and/or instruction and transforms the input into an output 450 of an output text. To perform the transformation, each neuron receives input signals, performs a weighted sum of the inputs according to weights assigned to each connection (e.g., 451, 452), and then applies an activation function (e.g., 461, 462, etc.) associated with the respective neuron to the result. The output of the activation function is passed to the next layer of neurons or serves as the final output of the network. The activation function may be the same or different across different layers. Example activation functions include but not limited to Sigmoid, hyperbolic tangent, Rectified Linear Unit (ReLU), Leaky ReLU, Softmax, and/or the like. In this way, after a number of hidden layers, input data received at the input layer 441 is transformed into rather different values indicative data characteristics corresponding to a task that the neural network structure has been designed to perform.

The output layer 443 is the final layer of the neural network structure. It produces the network's output or prediction based on the computations performed in the preceding layers (e.g., 441, 442). The number of nodes in the output layer depends on the nature of the task being addressed. For example, in a binary classification problem, the output layer may consist of a single node representing the probability of belonging to one class. In a multi-class classification problem, the output layer may have multiple nodes, each representing the probability of belonging to a specific class.

Therefore, the vision-language module 430 and/or one or more of its submodules 431-434 may comprise the transformative neural network structure of layers of neurons, and weights and activation functions describing the non-linear transformation at each neuron. Such a neural network structure is often implemented on one or more hardware processors 410, such as a graphics processing unit (GPU). An example neural network may be a feed-forward multi-layer perceptron, and/or the like.

In one embodiment, the vision-language module 430 and its submodules 431-?? may be implemented by hardware, software and/or a combination thereof. For example, the vision-language module 430 and its submodules 431-434 may comprise a specific neural network structure implemented and run on various hardware platforms 460, such as but not limited to CPUs (central processing units), GPUs (graphics processing units), FPGAs (field-programmable gate arrays), Application-Specific Integrated Circuits (ASICs), dedicated AI accelerators like TPUs (tensor processing units), and specialized hardware accelerators designed specifically for the neural network computations described herein, and/or the like. Example specific hardware for neural network structures may include, but not limited to Google Edge TPU, Deep Learning Accelerator (DLA), NVIDIA AI-focused GPUs, and/or the like. The hardware 460 used to implement the neural network structure is specifically configured based on factors such as the complexity of the neural network, the scale of the tasks (e.g., training time, input data scale, size of training dataset, etc.), and the desired performance.

In one embodiment, the neural network based vision-language module 430 and one or more of its submodules 431-434 may be trained by iteratively updating the underlying parameters (e.g., weights 451, 452, etc., bias parameters and/or coefficients in the activation functions 461, 462 associated with neurons) of the neural network based on a loss function. For example, during forward propagation, the training data such as images, and instructions are fed into the neural network. The data flows through the network's layers 441, 442, with each layer performing computations based on its weights, biases, and activation functions until the output layer 443 produces the network's output 450. In some embodiments, output layer 443 produces an intermediate output on which the network's output 450 is based.

The output generated by the output layer 443 is compared to the expected output (e.g., a "ground-truth" such as the corresponding known-good output text) from the training data, to compute a loss function that measures the discrepancy between the predicted output and the expected output. For example, the loss function may be cross entropy, MMSE, or another loss function. Given the loss, the negative gradient of the loss function is computed with respect to each weight of each layer individually. Such negative gradient is computed one layer at a time, iteratively backward from the last layer 443 to the input layer 441 of the neural network. These gradients quantify the sensitivity of the network's output to changes in the parameters. The chain rule of calculus is applied to efficiently calculate these gradients by propagating the gradients backward from the output layer 443 to the input layer 441.

Parameters of the neural network are updated backwardly from the last layer to the input layer (backpropagating) based on the computed negative gradient using an optimization algorithm to minimize the loss. The backpropagation from the last layer 443 to the input layer 441 may be conducted for a number of training samples in a number of iterative training epochs. In this way, parameters of the neural network may be gradually updated in a direction to result in a lesser or minimized loss, indicating the neural network has been trained to generate a predicted output value closer to the target output value with improved prediction accuracy. Training may continue until a stopping criterion is met, such as reaching a maximum number of epochs or achieving satisfactory performance on the validation data. At this point, the trained network can be used to make predictions on new, unseen data, such as unseen images and instructions of a variety of domains.

Neural network parameters may be trained over multiple stages. For example, initial training (e.g., pre-training) may be performed on one set of training data, and then an additional training stage (e.g., fine-tuning) may be performed using a different set of training data. In some embodiments, all or a portion of parameters of one or more neural-network model being used together may be frozen, such that the "frozen" parameters are not updated during that training phase. This may allow, for example, a smaller subset of the parameters to be trained without the computing cost of updating all of the parameters.

Therefore, the training process transforms the neural network into an "updated" trained neural network with updated parameters such as weights, activation functions, and biases. The trained neural network (e.g., the multimodal encoder 108) thus improves neural network technology in vision language tasks, such as captioning, question answering based on image content, and/or the like.

Figure 5:
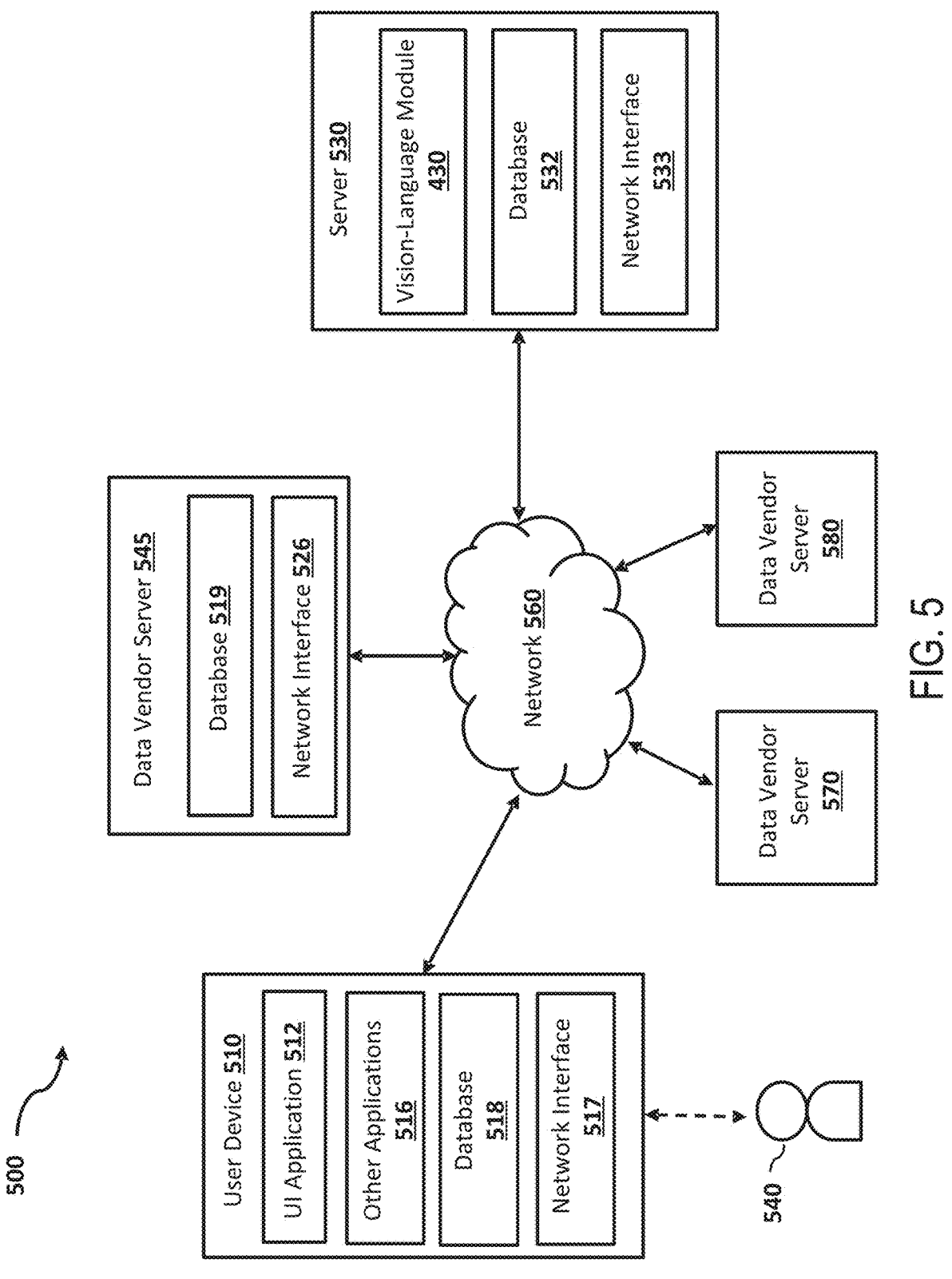
FIG. 5 is a simplified block diagram of a networked system suitable for implementing the vision-language instruction model framework described in FIGS. 1-3 and other embodiments described herein.

FIG. 5 is a simplified block diagram of a networked system 500 suitable for implementing the vision-language instruction model framework described in FIGS. 1-3 and other embodiments described herein. In one embodiment, system 500 includes the user device 510 which may be operated by user 540, data vendor servers 545, 570 and 580, server 530, and other forms of devices, servers, and/or software components that operate to perform various methodologies in accordance with the described embodiments. Exemplary devices and servers may include device, standalone, and enterprise-class servers which may be similar to the computing device 400 described in FIG. 4A, operating an OS such as a MICROSOFT® OS, a UNIX® OS, a LINUX® OS, or other suitable device and/or server-based OS. It can be appreciated that the devices and/or servers illustrated in FIG. 5 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 510, data vendor servers 545, 570 and 580, and the server 530 may communicate with each other over a network 560. User device 510 may be utilized by a user 540 (e.g., a driver, a system admin, etc.) to access the various features available for user device 510, which may include processes and/or applications associated with the server 530 to receive an output data anomaly report.

User device 510, data vendor server 545, and the server 530 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 500, and/or accessible over network 560.

User device 510 may be implemented as a communication device that may utilize appropriate hardware and software configured for wired and/or wireless communication with data vendor server 545 and/or the server 530. For example, in one embodiment, user device 510 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 510 of FIG. 5 contains a user interface (UI) application 512, and/or other applications 516, which may correspond to executable processes, procedures, and/or applications with associated hardware. For example, the user device 510 may receive a message indicating output text from the server 530 and display the message via the UI application 512. In other embodiments, user device 510 may include additional or different modules having specialized hardware and/or software as required.

In various embodiments, user device 510 includes other applications 516 as may be desired in particular embodiments to provide features to user device 510. For example, other applications 516 may include security applications for implementing client-side security features, programmatic client applications for interfacing with appropriate application programming interfaces (APIs) over network 560, or other types of applications. Other applications 516 may also include communication applications, such as email, texting, voice, social networking, and IM applications that allow a user to send and receive emails, calls, texts, and other notifications through network 560. For example, the other application 516 may be an email or instant messaging application that receives a prediction result message from the server 530. Other applications 516 may include device interfaces and other display modules that may receive input and/or output information. For example, other applications 516 may contain software programs for asset management, executable by a processor, including a graphical user interface (GUI) configured to provide an interface to the user 540 to view images and/or text.

User device 510 may further include database 518 stored in a transitory and/or non-transitory memory of user device 510, which may store various applications and data and be utilized during execution of various modules of user device 510. Database 518 may store user profile relating to the user 540, predictions previously viewed or saved by the user 540, historical data received from the server 530, and/or the like. In some embodiments, database 518 may be local to user device 510. However, in other embodiments, database 518 may be external to user device 510 and accessible by user device 510, including cloud storage systems and/or databases that are accessible over network 560.

User device 510 includes at least one network interface component 517 adapted to communicate with data vendor server 545 and/or the server 530. In various embodiments, network interface component 517 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 545 may correspond to a server that hosts database 519 to provide training datasets including input images, instructions, and known-good output text to the server 530. The database 519 may be implemented by one or more relational database, distributed databases, cloud databases, and/or the like.

The data vendor server 545 includes at least one network interface component 526 adapted to communicate with user device 510 and/or the server 530. In various embodiments, network interface component 526 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 545 may send asset information from the database 519, via the network interface 526, to the server 530.

The server 530 may be housed with the vision-language module 430 and its submodules described in FIG. 4A. In some implementations, vision-language module 430 may receive data from database 519 at the data vendor server 545 via the network 560 to generate output text. The generated output text may also be sent to the user device 510 for review by the user 540 via the network 560.

The database 532 may be stored in a transitory and/or non-transitory memory of the server 530. In one implementation, the database 532 may store data obtained from the data vendor server 545. In one implementation, the database 532 may store parameters of the vision-language module 430. In one implementation, the database 532 may store previously generated vectors or outputs, and the corresponding input feature vectors.

In some embodiments, database 532 may be local to the server 530. However, in other embodiments, database 532 may be external to the server 530 and accessible by the server 530, including cloud storage systems and/or databases that are accessible over network 560.

The server 530 includes at least one network interface component 533 adapted to communicate with user device 510 and/or data vendor servers 545, 570 or 580 over network 560. In various embodiments, network interface component 533 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 560 may be implemented as a single network or a combination of multiple networks. For example, in various embodiments, network 560 may include the Internet or one or more intranets, landline networks, wireless networks, and/or other appropriate types of networks. Thus, network 560 may correspond to small scale communication networks, such as a private or local area network, or a larger scale network, such as a wide area network or the Internet, accessible by the various components of system 500.

Example Work Flows

FIG. 6 is an example logic flow diagram illustrating a method of vision-language instruction responding based on the framework shown in FIGS. 1-3, according to some embodiments. One or more of the processes of method 600 may be implemented, at least in part, in the form of executable code stored on non-transitory, tangible, machine-readable media that when run by one or more processors may cause the one or more processors to perform one or more of the processes. In some embodiments, method 600 corresponds to the operation of the vision-language module 430 (e.g., FIGS. 4A and 5) that generates responses to image and instruction inputs.

As illustrated, the method 600 includes a number of enumerated steps, but aspects of the method 600 may include additional steps before, after, and in between the enumerated steps. In some aspects, one or more of the enumerated steps may be omitted or performed in a different order.

At step 602, a system (e.g., computing device 400 or server 530) receives, via a data interface (e.g., data interface 415 or network interface 533), the input image (e.g., input image 102) and the text instruction (e.g., instruction 112) comprising an instruction relating to the image.

At step 604, the system encodes, via an image encoder (e.g., image encoder 104), the image into a first image representation (e.g., image embedding 118).

At step 606, the system generates, by a multimodal encoder (e.g., multimodal encoder 108), a second image representation (e.g., output embedding 102 or soft prompt 116) based on cross-attending the first image representation to the text instruction.

At step 608, the system generates, by a neural network based language model (e.g., language model 122), a vision-language task output (e.g., output text 124) in response to the text instruction based on an input combining the second image representation and the text instruction. In some embodiments, the system adapts the second image representation for the neural network based language model via a feed forward neural network (e.g., feed forward 114). In some embodiments, the system adapts the text instruction with an instruction template text. In some embodiments, the instruction template text during training is modified according to the known-good output text. For example, the instruction text received may be "describe this image" and the template may add the word "briefly" to the instruction text based on a determination that the known-good output text is below a predetermined threshold in length (e.g., number of words).

At step 610, the system trains parameters associated with at least one model based on the vision-language task output. In some embodiments, training comprises receiving a known-good text output via the data interface, computing a loss based on the vision-language task output and the known-good text output, and training the multimodal encoder based on the loss. In some embodiments, the system keeps the image encoder and the neural network based language model frozen while training the multimodal encoder. In some embodiments, the generating the second image representation is further based on a set of query vectors. In some embodiments, the system updates the set of query vectors based on the vision-language task output and the known-good text output. In some embodiments, the multimodal encoder is pretrained based on an output of the multimodal encoder without the neural network based language model. For example, a loss may be computed based on the vision-language task output which does not require the use of a language model.

Example Results

FIGS. 7A-7B illustrate exemplary vision-language instruction responses, according to some embodiments. In FIG. 7A, input image 102*a* is an image of a dog wearing robotic armor, and associated instruction 112*a* is "what makes this dog special?". Using these inputs, an embodiment of the framework described herein may generate an output text 124*a* which says "The dog in the image is wearing futuristic armor, giving it a unique and futuristic appearance. This combination of elements makes the dog stand out from other dogs and adds an element of fantasy or sci-fi to the image. Additionally, the dog's posture and facial expression convey a sense of confidence and determination, further emphasizing its unique features."

In FIG. 7B, input image 102*b* is an image of man walking through the debris of a natural disaster, and associated instruction 112*b* is "What could have happened based on the current scene?". Using these inputs, an embodiment of the framework described herein may generate an output text 124*b* which says "Based on the current scene in the image, it is possible that a hurricane or severe weather event caused significant damage to the buildings and infrastructure in the area. The person walking through the debris-covered area suggests that they are inspecting the damage caused by the disaster. The presence of palm trees indicates that the location may be in a tropical or sub-tropical region."

A wide variety of instructions may be used to provide responses about a provided image. Types of instructions may include, for example, image captioning, image question answering, visual reasoning, visual conversational, knowledge grounded image question answering, image classification, etc.

FIGS. 8-11 represent exemplary test results using embodiments described herein.

To ensure the diversity of instruction tuning data while considering their accessibility, a comprehensive set of publicly available vision-language datasets were used for training and validation. The training data collection covered 11 task categories and 26 datasets, including image captioning, image captioning with reading comprehension, visual reasoning, image question answering, knowledge-grounded image question answering, image question answering with reading comprehension, image question generation (adapted from the QA datasets), video question answering, visual conversational question answering, image classification, and an instruction dataset.

Datasets utilized include the following: COCO Caption as described in Lin et al., Microsoft coco: Common objects in context, ECCV, 2014. Web CapFilt as described in Li et al., Blip-2: Bootstrapping language-image pre-training with frozen image encoders and large language models, ICML, 2023. NoCaps as described in Agrawal et al., nocaps: novel object captioning at scale, ICCV, pages 8948-8957, 2019. Flickr30K as described in Young et al., From image descriptions to visual denotations: New similarity metrics for semantic inference over event descriptions, Transactions of the Association for Computational Linguistics, 2, 2014. TextCaps as described in Sidorov et al., Textcaps: a dataset for image captioning with reading comprehension, 2020. VQAv2 as described in Goyal et al., Making the v in vqa matter: Elevating the role of image understanding in visual question answering, CVPR, July 2017. VizWiz as described in Gurari et al., Vizwiz grand challenge: Answering visual questions from blind people, CVPR, 2018. GQA as described in Hudson et al., Gqa: A new dataset for real-world visual reasoning and compositional question answering, CVPR, 2019. IconQA as described in Lu et al., Iconqa: A new benchmark for abstract diagram understanding and visual language reasoning, NeurIPS Track on Datasets and Benchmarks, 2021. OKVQA as described in Marino et al., Ok-vqa: A visual question answering benchmark requiring external knowledge, CVPR, 2019. A-OKVQA as described in Schwenk et al., A-okvqa: A benchmark for visual question answering using world knowledge, ECCV, 2022. ScienceQA as described in Lu et al., Learn to explain: Multimodal reasoning via thought chains for science question answering, NeurIPS, 2022. Visual Dialog as described in Das et al., Visual dialog, CVPR, 2017. OCR-VQA [31]. TextVQA as described in Singh et al., Towards vqa models that can read, CVPR, pages 8317-8326, 2019. Hateful-Memes as described in Kiela et al., The hateful memes challenge: Detecting hate speech in multimodal memes, NeurIPS, 2020. LLaVA-Instruct-150K as described in Liu et al., Visual instruction tuning, 2023. MSVD-QA as described in Xu et al., Multiinstruct: Improving multi-modal zero-shot learning via instruction tuning, arXiv, abs/2212.10773, 2022. MSRVTT-QA Xu et al., Video question answering via gradually refined attention over appearance and motion, Proceedings of the 25$^{th}$ ACM International Conference on Multimedia, page 1645-1653, 2017. iVQA as described in Yang et al., Just ask: Learning to answer questions from millions of narrated videos, ICCV, pages 1686-1697, 2021.

As discussed above, methods described herein may be used with different language models. Experiments were performed using different models, including different versions of the models with different numbers of parameters. Models used in experiments include the following: Flamingo as described in Alayrac et al., Flamingo: a visual language model for few-shot learning, NeurIPS, 2022. FlanT5 as described in Chung et al., Scaling instruction-finetuned language models, arXiv:2210.11416, 2022. Vicuna, an open source chat-bot. LLaMA as described in Touvron et al., Llama: Open and efficient foundation language models, arXiv:2302.13971, 2023.

Results for "BLIP-2" represent a BLIP-2 type multimodal encoder used with an LLM without instruction-tuning. InstructBLIP results are determined using a model with instruction tuning performed as described herein.

For every task, 10 to 15 distinct instruction templates in natural language were used. These templates served as the foundation for constructing instruction tuning data, which articulates the task and the objective. For public datasets inherently favoring short responses, terms such as short and briefly were inserted into some of their corresponding instruction templates to reduce the risk of the model overfitting to always generating short outputs. For the LLaVA-Instruct-150K dataset, no additional instruction templates were used since it is naturally structured in the instruction format. Example instruction templates for various datasets include: "<image> What is the answer to the following question? [question from dataset]", "<image> A short image caption: [caption from dataset], and "<image> Based on the image, provide a question with the answer: [answer from dataset]. Question:". For these instruction templates, <image>represented the soft prompt 116, and the items in brackets is the unmodified text from the corresponding dataset.

To ensure sufficient data and tasks for training and zero-shot evaluation, the 26 datasets were divided into 13 held-in datasets for instruction tuning, and 13 held-out datasets for evaluation.

For held-out evaluation, the aim was to understand how instruction tuning improves the model's zero-shot performance on unseen data. held-out data was in two groups: 1) datasets not exposed to the model during training, but whose tasks are present in the held-in cluster; and 2) datasets and their associated tasks that remain entirely unseen during training. Addressing the first type of held-out evaluation is nontrivial due to the data distribution shift between held-in and held-out datasets. For the second type, the experiment held out several tasks completely, including visual reasoning, video question answering, visual conversational QA, and image classification.

To avoid data contamination, datasets were selected carefully so that no evaluation data appeared in the held-in training cluster across different datasets. During instruction tuning, all the held-in training sets were mixed and instruction templates were sampled uniformly for each dataset. The models were trained with a standard language modeling loss to directly generate the response given the instruction. Furthermore, for datasets that involve scene texts, the experiment added OCR tokens in the instruction as supplementary information.

Due to the large number of training datasets and the significant differences in the size of each dataset, mixing them uniformly could cause the model to overfit smaller datasets and underfit larger datasets. To mitigate the problem, datasets may be sampled with probabilities proportional to the square root of their sizes, or the numbers of training samples. Generally, given D datasets with sizes {S1, S2, . . ., SD}, the probability of a data sample being selected from a dataset d during training is $$p_d = \frac{\sqrt{S_d}}{\sum_{i=1}^{D} \sqrt{S_i}}.$$

On top of this formula, manual adjustments may be made to the weights of certain datasets to improve optimization. This is warranted by inherent differences in the datasets and tasks that require varying levels of training intensity despite similar sizes. To be specific, the weight of some datasets may be lowered when the dataset features multiple-choice questions, and increase the weight of datasets which require open-ended text generation.

FIG. 8 illustrates zero-shot results on the held-out datasets. Visdial, HM, and SciQA denote the Visual Dialog, HatefulMemes, and ScienceQA datasets, respectively. For ScienceQA, results were evaluated on the set with image context. The CIDEr score is reported (as described in Vedantam et al., Cider: Consensus-based image description evaluation, 2015 IEEE Conference on Computer Vision and Pattern Recognition (CVPR), pages 4566-4575, 2015) for NoCaps and Flickr30K, iVQA accuracy for iVQA, AUC score for HatefulMemes, and Mean Reciprocal Rank (MRR) for Visual Dialog. For all other datasets, scores report the top-1 accuracy (%).

As demonstrated in FIG. 8, zero-shot state of the art results were achieved on all datasets. InstructBLIP consistently surpasses its original backbone, BLIP-2, by a significant margin across all LLMs, demonstrating the effectiveness of vision-language instruction tuning. For instance, InstructBLIP FlanT5XL yields an average relative improvement of 15.0% when compared to BLIP-2 FlanT5XL. Furthermore, instruction tuning boosts zero-shot generalization on unseen task categories such as video QA. InstructBLIP achieves up to 47.1% relative improvement on MSRVTT-QA over the previous SOTA despite having never been trained with temporal video data. Finally, the smallest InstructBLIP FlanT5XL with 4 B parameters outperforms Flamingo-80B on all six shared evaluation datasets with an average relative improvement of 24.8%. This illustrates that as good or better performance may be achieved by methods described herein with fewer parameters, and therefore lower memory requirements.

FIG. 9 illustrates results of ablation studies that remove the instruction-aware Visual Features and the balanced data sampling strategy (Section 2.4). For held-in evaluation, experiments computed the average score of four datasets, including COCO Caption, OKVQA, A-OKVQA, and Text-Caps. For held-out evaluation, five datasets from different tasks are shown. As illustrated in FIG. 9, the removal of instruction awareness in visual features downgrades performance significantly across all datasets. The performance drop is more severe in datasets that involve spatial visual reasoning (e.g., ScienceQA) or temporal visual reasoning (e.g., iVQA), where the instruction input to the multimodal encoder can guide visual features to attend to informative image regions. The removal of the data balancing strategy causes unstable and uneven training, as different datasets achieve peak performance at drastically different training steps. The lack of synchronized progress over multiple datasets harms the overall performance.

FIG. 10 illustrates a comparison of instruction tuning and multitask training based on BLIP-2 FlanT5XL backbone. For held-in evaluation, experiments computed the average score across all held-in datasets. For held-out evaluation, experiments computed the average score across GQA, TextVQA, VSR, HatefulMemes, IconQA, ScienceQA, iVQA, VizWiz. As shown, instruction tuning and multitask learning exhibit similar performance on the held-in datasets. This suggests that the model can fit these two different input patterns comparably well, as long as it has been trained with such data. On the other hand, instruction tuning yields a significant improvement over multitask learning on unseen held-out datasets, whereas multitask learning still performs on par with the original BLIP-2. This indicates that instruction tuning is the key to enhance the model's zero-shot generalization ability.

FIG. 11 illustrates results of finetuning BLIP-2 and InstructBLIP on downstream datasets. Compared to BLIP-2, InstructBLIP provides a better weight initialization model and achieves SOTA performance on three out of four datasets. Compared to BLIP-2, InstructBLIP leads to better finetuning performance on all datasets, which validates InstructBLIP as a better weight initialization model for task-specific finetuning. InstructBLIP sets new state-of-the-art finetuning performance on ScienceQA (IMG), OCR-VQA, A-OKVQA, and is outperformed on OKVQA by PaLM-E with 562 B parameters. Additionally, FIG. 11 illustrates that the FlanT5-based InstructBLIP is superior at multi-choice tasks, whereas Vicuna-based InstructBLIP is generally better at open-ended generation tasks. This disparity can be primarily attributed to the capabilities of their frozen LLMs, as they both employ the same image encoder. Although FlanT5 and Vicuna are both instruction-tuned LLMs, their instruction data significantly differ. FlanT5 is mainly finetuned on NLP benchmarks containing many multi-choice QA and classification datasets, while Vicuna is finetuned on open-ended instruction-following data.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method of generating a vision-language task output for a text instruction relating to an input image, the method comprising:

receiving, via a data interface, the input image and the text instruction comprising an instruction relating to the input image;

encoding, via an image encoder, the input image into a first image representation;

generating, by a multimodal encoder connected to the image encoder, a second image representation based on cross-attending the first image representation to the text instruction by a cross-attention layer in the multimodal encoder; and generating, by a neural network based language model connected to the multimodal encoder, the vision-language task output in response to the text instruction based on an input combining the second image representation and the text instruction.

2. The method of claim 1, further comprising:

receiving a known-good text output via the data interface;

computing a loss based on the vision-language task output and the known-good text output; and training the multimodal encoder based on the loss.

3. The method of claim 2, further comprising:

keeping the image encoder and the neural network based language model frozen while training the multimodal encoder.

4. The method of claim 2, wherein the generating the second image representation is further based on a set of query vectors, further comprising:

updating the set of query vectors based on the vision-language task output and a known-good text output.

5. The method of claim 1, further comprising:

pre-training the multimodal encoder based on an output of the multimodal encoder without the neural network based language model.

6. The method of claim 1, further comprising:

adapting the second image representation for the neural network based language model via a feed forward neural network.

7. The method of claim 1, further comprising:

adapting the text instruction with an instruction template text.

8. A system for generating a vision-language task output for a text instruction relating to an input image, the system comprising:

a memory that stores a neural network based language model and a plurality of processor executable instructions;

a data interface that receives the input image and the text instruction comprising an instruction relating to the input image; and one or more hardware processors that read and execute the plurality of processor-executable instructions from the memory to perform operations comprising:

encoding, via an image encoder, the input image into a first image representation;

generating, by a multimodal encoder connected to the image encoder, a second image representation based on cross-attending the first image representation to the text instruction by a cross-attention layer in the multimodal encoder; and generating, by the neural network based language model connected to the multimodal encoder, the vision-language task output in response to the text instruction based on an input combining the second image representation and the text instruction.

9. The system of claim 8, the operations further comprising:

receiving a known-good text output via the data interface;

computing a loss based on the vision-language task output and the known-good text output; and training the multimodal encoder based on the loss.

10. The system of claim 9, the operations further comprising:

keeping the image encoder and the neural network based language model frozen while training the multimodal encoder.

11. The system of claim 9, wherein the generating the second image representation is further based on a set of query vectors, the operations further comprising:

updating the set of query vectors based on the vision-language task output and a known-good text output.

12. The system of claim 8, the operations further comprising:

pre-training the multimodal encoder based on an output of the multimodal encoder without the neural network based language model.

13. The system of claim 8, the operations further comprising:

adapting the second image representation for the neural network based language model via a feed forward neural network.

14. The system of claim 8, the operations further comprising:

adapting the text instruction with an instruction template text.

15. A non-transitory machine-readable medium comprising a plurality of machine-executable instructions which, when executed by one or more processors, are adapted to cause the one or more processors to perform operations comprising:

receiving, via a data interface, an input image and a text instruction comprising an instruction relating to the input image;

encoding, via an image encoder, the input image into a first image representation;

generating, by a multimodal encoder connected to the image encoder, a second image representation based on cross-attending the first image representation to the text instruction by a cross-attention layer in the multimodal encoder; and generating, by a neural network based language model connected to the multimodal encoder, a vision-language task output in response to the text instruction based on an input combining the second image representation and the text instruction.

16. The non-transitory machine-readable medium of claim 15, the operations further comprising:

receiving a known-good text output via the data interface;

computing a loss based on the vision-language task output and the known-good text output; and training the multimodal encoder based on the loss.

17. The non-transitory machine-readable medium of claim 16, the operations further comprising:

keeping the image encoder and the neural network based language model frozen while training the multimodal encoder.

18. The non-transitory machine-readable medium of claim 16, wherein the generating the second image representation is further based on a set of query vectors, the operations further comprising:

updating the set of query vectors based on the vision-language task output and a known-good text output.

19. The non-transitory machine-readable medium of claim 15, the operations further comprising:

pre-training the multimodal encoder based on an output of the multimodal encoder without the neural network based language model.

20. The non-transitory machine-readable medium of claim 15, the operations further comprising:

adapting the second image representation for the neural network based language model via a feed forward neural network.

\* \* \* \* \*